United States Patent [19]
Barns-Slavin et al.

[11] Patent Number: 5,995,950
[45] Date of Patent: Nov. 30, 1999

[54] CARRIER MANAGEMENT SYSTEM HAVING A CAPABILITY TO DETERMINE DISCOUNTED SHIPPING CHARGES FOR GROUPS OF PARCELS HAVING THE SAME CONSIGNEE

[75] Inventors: Ileana Barns-Slavin, Wilton; Clint F. Brandien, Prospect, both of Conn.; George J. Brazis, Jr., Windsor, Calif.; Norman Goodwin, Shelton; Jacques Hasbani, Bethel, both of Conn.; John Burgess Howard, Forestville; Terry Elwin Raikes, Santa Rosa, both of Calif.

[73] Assignee: Pitney Bowes Inc., Stamford, Conn.

[21] Appl. No.: 08/110,456

[22] Filed: Aug. 23, 1993

[51] Int. Cl.$^6$ .................................................. G07B 17/02
[52] U.S. Cl. ............................................................ 705/402
[58] Field of Search ........................ 364/464.02, 464.03; 705/401, 402, 410

[56] References Cited

U.S. PATENT DOCUMENTS

| | | | |
|---|---|---|---|
| 4,325,440 | 4/1982 | Crowley et al. | 177/25.15 |
| 4,495,581 | 1/1985 | Piccione | 364/464.03 |
| 4,499,545 | 2/1985 | Daniels et al. | 364/464.02 |
| 4,589,555 | 5/1986 | Hollingsworth | 209/703 |
| 4,595,984 | 6/1986 | Daniels | 364/466 |
| 4,814,995 | 3/1989 | Daniels, Jr. | 364/464.02 |
| 4,821,195 | 4/1989 | Baer et al. | 364/464.02 |
| 4,999,481 | 3/1991 | Baer et al. | 364/464.02 X |
| 5,072,397 | 12/1991 | Barns-Slavin et al. | 364/464.02 |
| 5,117,364 | 5/1992 | Barns-Slavin et al. | 364/464.03 |
| 5,287,976 | 2/1994 | Mayer et al. | 364/405 X |
| 5,337,246 | 8/1994 | Carroll et al. | 364/464.02 |

*Primary Examiner*—Edward R. Cosimano
*Attorney, Agent, or Firm*—Robert E. Meyer; Melvin J. Scolnick

[57] ABSTRACT

A carrier management system having the capability to compute discounted shipping charges. The carrier management system includes inputs for input of parcel weight, information for selecting a class of carrier service, a parcel identification number and operator input signals. A data processor responds to a first operator input signal to append a suffix to the parcel identification number and store the parcel information, and for succeeding parcels increments the suffix and stores the parcel information. Upon input of a second operator input signal the data processor determines the discounted shipping rate for the group of parcels. The data processor also compares the discounted and non-discounted costs and in response to other operator input signals adds or deletes parcels in the group.

12 Claims, 8 Drawing Sheets

CARRIER MANAGEMENT SYSTEM HAVING A CAPABILITY TO DETERMINE DISCOUNTED SHIPPING CHARGES FOR GROUPS OF PARCELS HAVING THE SAME CONSIGNEE

BACKGROUND OF THE INVENTION

The subject invention relates to carrier management systems for enabling a user to determine the shipping charges for shipping of parcels by a selected carrier. More particularly, the subject invention is directed to such a system wherein discounted shipping charges can be determined for groups of parcels to be shipped to a single consignee.

In the shipping of parcels, it is frequently desirable to provide for shipping by a carrier selected from a group of carriers. In current shipping practice, provisions must be made for shipping of parcels by two major carriers; specifically the United States postal service (USPS) and the United Parcel Service (UPS), a private carrier, as well as a large number of smaller private carriers. In prior tracking or recording systems, various data concerning parcels or groups of parcels to be shipped were entered by an operator so that charges for each transaction, i.e. shipment of a parcel or consolidated group of parcels, could be determined. The data included information relating to the shipment, such as, the selection of the carrier, the number of parcels in a consolidated shipment, the weight of a parcel, delivery address data, invoice number, date, time, etc. Typically, weight could be entered either manually, through a keyboard, or automatically by a scale; while other data were generally entered by an operator through a keyboard, barcode reader, or similar input.

Such systems however did not include a capability for determining discounted shipping charges for groups of parcels to be shipped to a single consignee, where the group of parcels met certain predetermined requirements such as, total weight of the group or average weight of the group. Other possible requirements might relate to the total number of parcels in the group, minimum or maximum weight of parcels in the group, and other restrictions which might be of concern to the carrier.

Typically, known carrier management systems are disclosed, for example in U.S. Pat. Nos. 4,325,440; 4,495,581; and 4,595,984.

One such system is the J90M system, marketed by the assignee of the present application. The J90M includes a microprocessor, keyboard and display in a single integrated console, a separate scale, and a separate printer. The J90M has the capability to weight parcels; input shipment data and determine charges as described above; and prints address labels and the like as well as manifest for parcels to be shipped by a selected carrier.

The J90M has a capability for handling "multi-packages", that is groups of packages which are to be delivered to a single consignee. The user enters a parcel identification number and shipment data for the first package in the group and the system automatically appends a distinct suffix to the parcel identification number for each package in the group and uses the shipment data input for the first package to compute the shipping charges for each package. The J90M however does not have a capability for handling group discounts which maybe provided by a carrier.

U.S. Pat. No. 5,072,397; to: Barns-Slavin et al.; issued: Dec. 10, 1991; for: Carrier Management System Enabling Determination of Charges With Discounts, describes a carrier management system which has a capability for handling discount rate structures. In this system a discount from the standard charge is defined by manually entering a discount as a percentage, flat rate, or sum of a percentage and a flat rate, into the system during set up for one or more classes of service selected from the plurality of classes of service available. These discounts maybe allowed only after a certain cumulative total dollar amount, number of pieces, or weight have been shipped using a particularly class of service. (Note column 6, lines 15–31). That is, these discounts are provided not for a group of parcels sent to a single consignee, but to high volume users of particular classes of service.

Thus, it is an object of the subject invention to provide a carrier management system having an easily implemented and flexible system for determining discounted shipping charges for groups of parcels sent to a single consignee.

BRIEF SUMMARY OF THE INVENTION

The above object is achieved and the disadvantages of the prior art are overcome in accordance with the subject invention by means of a carrier management system which includes an input for input of parcel weight; a second input for input of information, the information including: shipment data for selecting a class of service from a group of classes of service provided by the selected carrier, a parcel identification number, and operator input signals; a first memory for storing rate data; a second memory for storing predetermined requirements for a group of parcels eligible for a group discount; and output for outputting prompts to an operator; and a data processor. The data processor responds to the weight, the shipment data and a first operator input signal to append a suffix to the parcel identification number and to store the weight and at least a portion of the shipment data with the parcel identification number for a first parcel; and for succeeding parcels increments the suffix and stores the parcel identification number and the incremented suffix and the weight. The data processor also responds to a second operator input signal to determine if a group of parcels consisting of the first parcel and the succeeding parcels conforms to the predetermined requirements and, if so, determines discounted shipping costs for the group in accordance with the stored weights and stored portion of the shipping data and the stored rates; and if the group does not conform to the requirements controls the output means to output a prompt to advise that the group does not qualify for the discount.

In accordance with one aspect of the subject invention after the data processor receives the second operator input signal the data processor responds to re-input of the parcel identification number in association with another parcel to again increment the suffix and append it to the parcel identification number for the other parcel, and redetermines the discounted shipping charges with the other parcel added to the group.

In accordance with another aspect of the subject invention, the data processor compares the discounted shipping cost with shipping costs for the parcels in the group considered as separate items, outputs a prompt advising of this, and responds to another operator input signal to process each parcel of the group as a separate item.

In accordance with another aspect of the subject invention the data processor is responsive to still another operator input signal to delete an identified parcel from the group and redetermine the discounted shipping cost if the group still meets the predetermined requirements.

Thus, it can be seen that the subject invention advantageously achieves the above object and overcomes the disadvantages of the prior art. Other objects and advantages of the subject invention will become apparent to those skilled in the art from consideration of the attached drawings and the detailed description set forth below.

DETAILED OF DESCRIPTION OF PREFERRED EMBODIMENTS OF THE SUBJECT INVENTION

Figure 1:
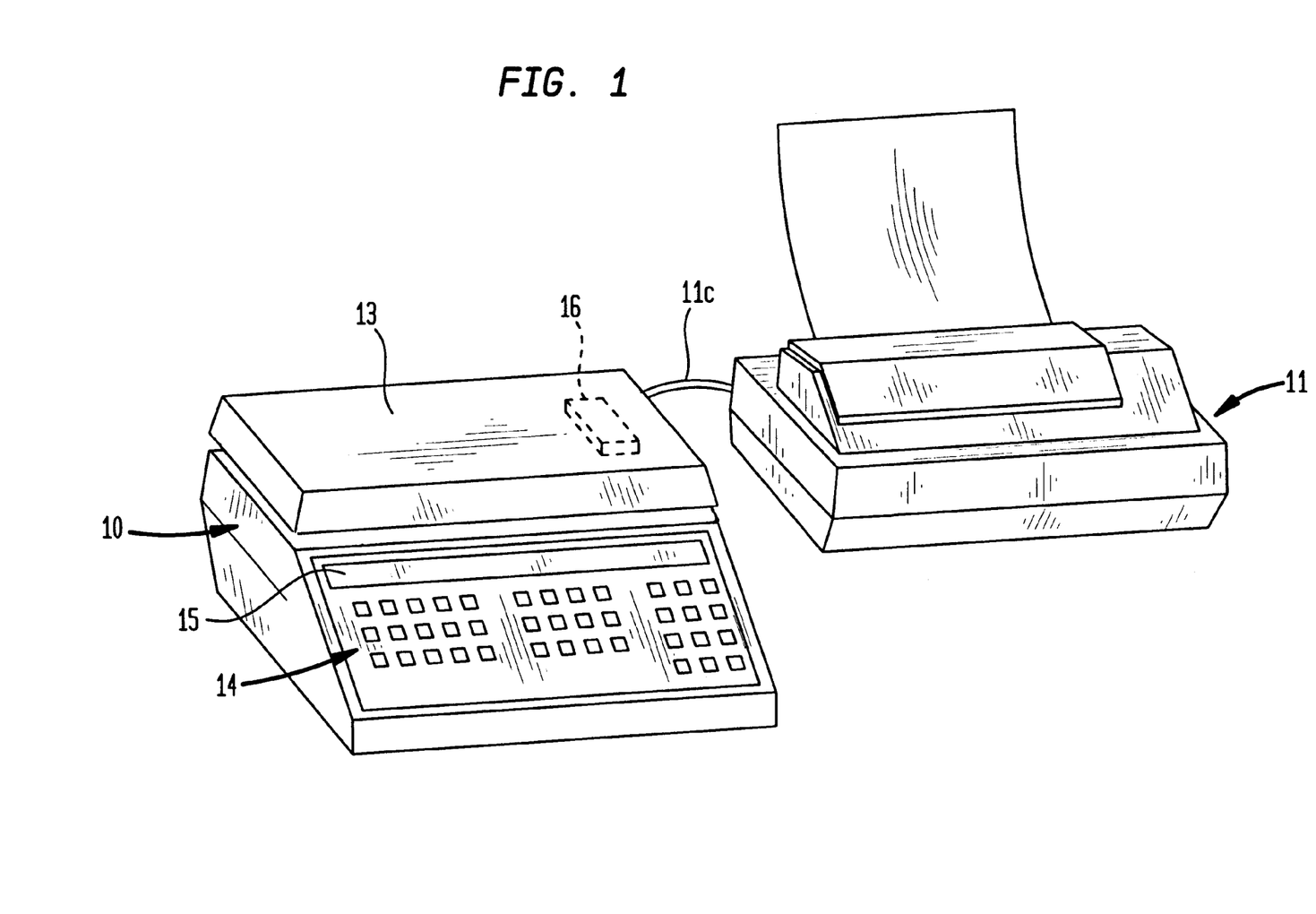
FIG. 1 is a perspective illustration of a carrier management system which may incorporate the present invention.

Turning to FIG. 1, a carrier management system in accordance with the subject invention includes console 10 and printer 11 connected to console 10 by cable 11c. Console 10 supports platform 13 for receiving parcels to be weighed. The front panel of console 10 includes keyboard 14 and display 15. Replaceable board 16, shown in phantom is mounted on or in console 10 below platform 13. Board 16 supports one or more read-only memories (ROM's) or programmable read-only memories (PROM's).

Figure 2:
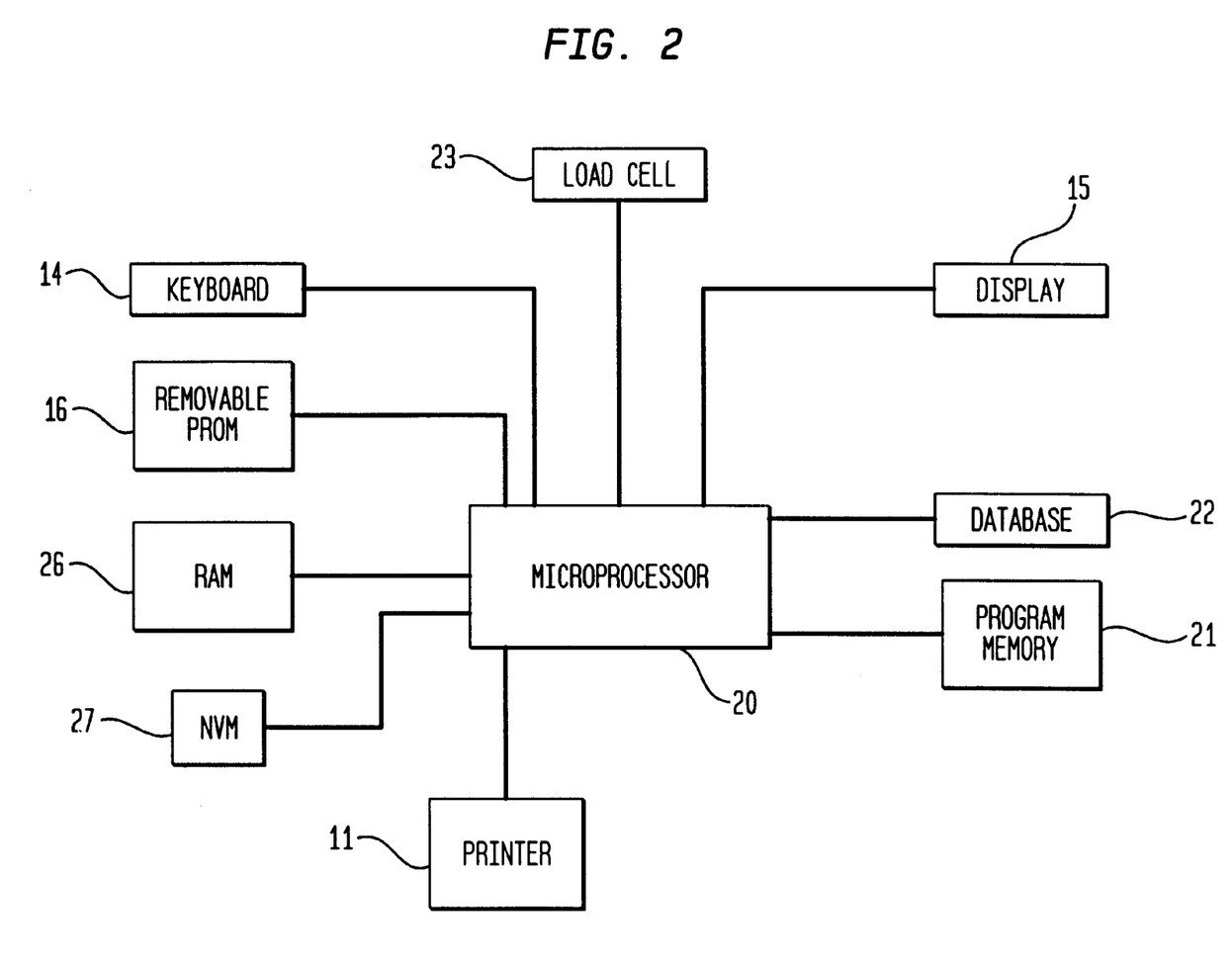
FIG. 2 is a block diagram of the system of FIG. 1.

FIG. 2 is a block diagram of the system of FIG. 1. The system incorporates microcomputer 20 having non-volatile program memory 21, for storing the program for operation of the system, and a non-volatile database memory 22 for storing rate data for all of the carriers and classes of service for which the system has the capability to determine shipping charges.

In accordance with the subject invention the rate data stored in memory 22 includes both single piece rates and group discount rates, and preferably may include special, alternative single piece rates such as the rate structure marketed by UPS under the trade name "Groundsaver". A second portion of memory 22 (or equivalently a second memory) stores the predetermined requirements which must be met by a group for the group to receive a group discount. Memory 22 is preferably replaceable PROM's, a floppy disk, or other replaceable memory so that rate data may be updated from time to time. Alternatively rate data may be updated by down-loading to writeable memory in a conventional manner. Load cell 23, which supports platform 13, inputs the weight for a parcel to be shipped which has been placed on platform 13 to microprocessor 20 in a conventional manner which need not be discussed further here for an understanding of the subject invention. Keyboard 14 is provided for input of information including shipment data for selecting a class of service provided by a selected carrier, a parcel identification number, and operator input signals. (Those skilled in the art will recognize that a particular key stroke on keyboard 14 may represent different operator input signals depending upon the state of the system. For example, "Y" and "N" represent different operator inputs depending upon the prompt displayed on display 15.) Display 15 is provided to output various information including charges as computed and prompts to an operator to elicit necessary inputs.

Printer 11 is provided to print manifests, shipping labels, etc. in a conventional manner which need not be discussed further here for an understanding of the subject invention.

The system is also provided with random access memory (RAM) 26 to provide working storage and additional non-volatile memory 27 for storing certain critical parameters such as calibration constants. Removable PROM's 16 store data unique to the user of the system, and are replaceable by other PROM's in order for example, to enable a serviceman to gain access to critical data stored in non-volatile memory 27.

Keyboard 14 comprises a plurality of multi-function keys which are used to input shipment data, select special functions, and provide other inputs as necessary for operation of the system. Certain of the keys of keyboard 14 are used to select particular classes of service for particular carrier (e.g. UPS International) while other are used to select particular carriers (e.g. Federal Express) and selection of particular classes of service is input in a response to prompts displayed on display 15 by the system. Other keys are used to input request for special services (e.g. COD).

Figure 3A:
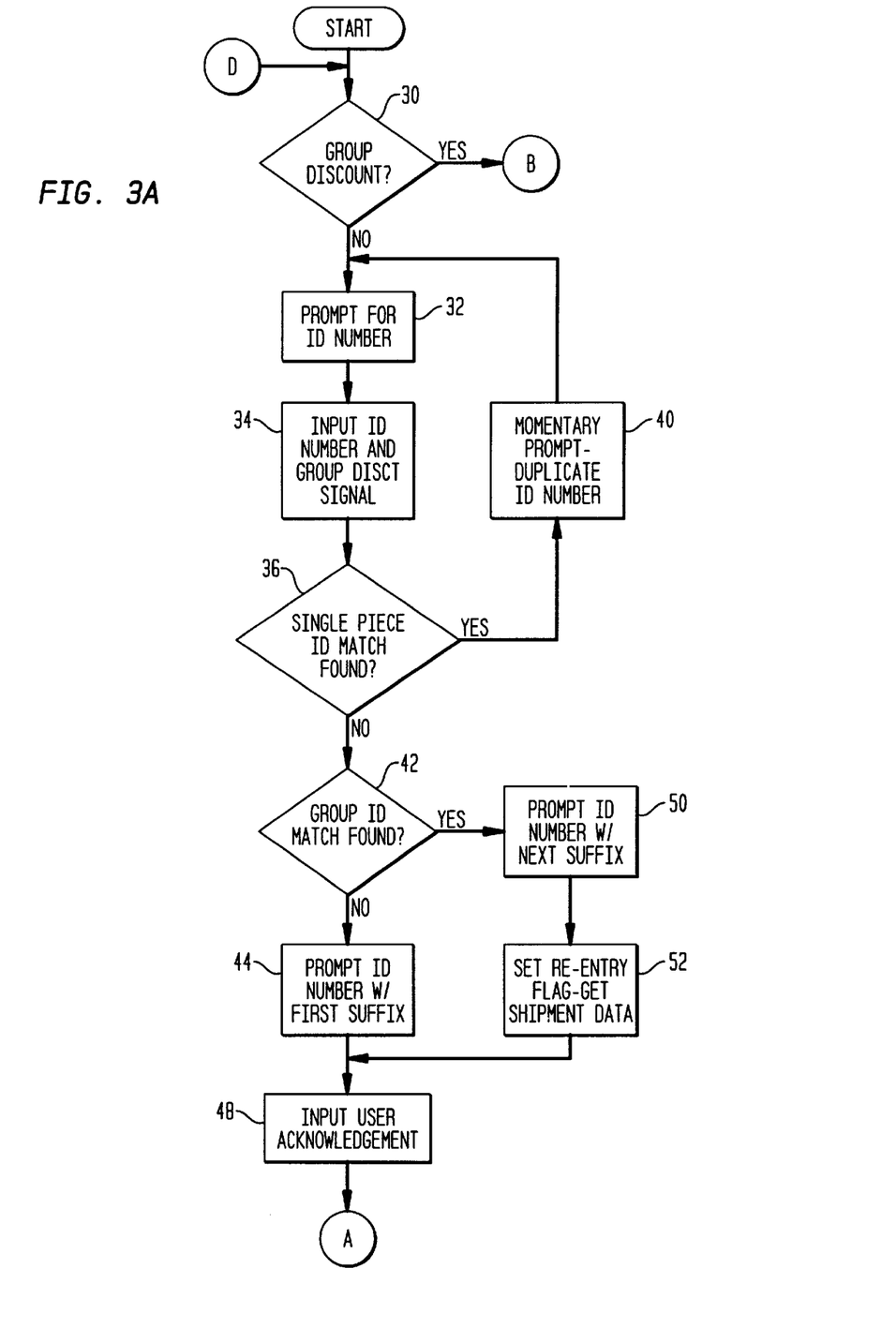
FIGS. 3a, 3b, 3c, and 3d show a flow chart of the operation of the system of FIG. 1 in determining discounted shipping costs.

In either event, at 48, the operator inputs an acknowledgment of the displayed parcel identification number and suffix and microprocessor 20 then goes to 56. (If the operator does not wish to continue with the group discount determination because of an inadvertent re-use of a parcel identification number, or for any other reason, the operator must abort the group discount determination.)

Figure 3B:
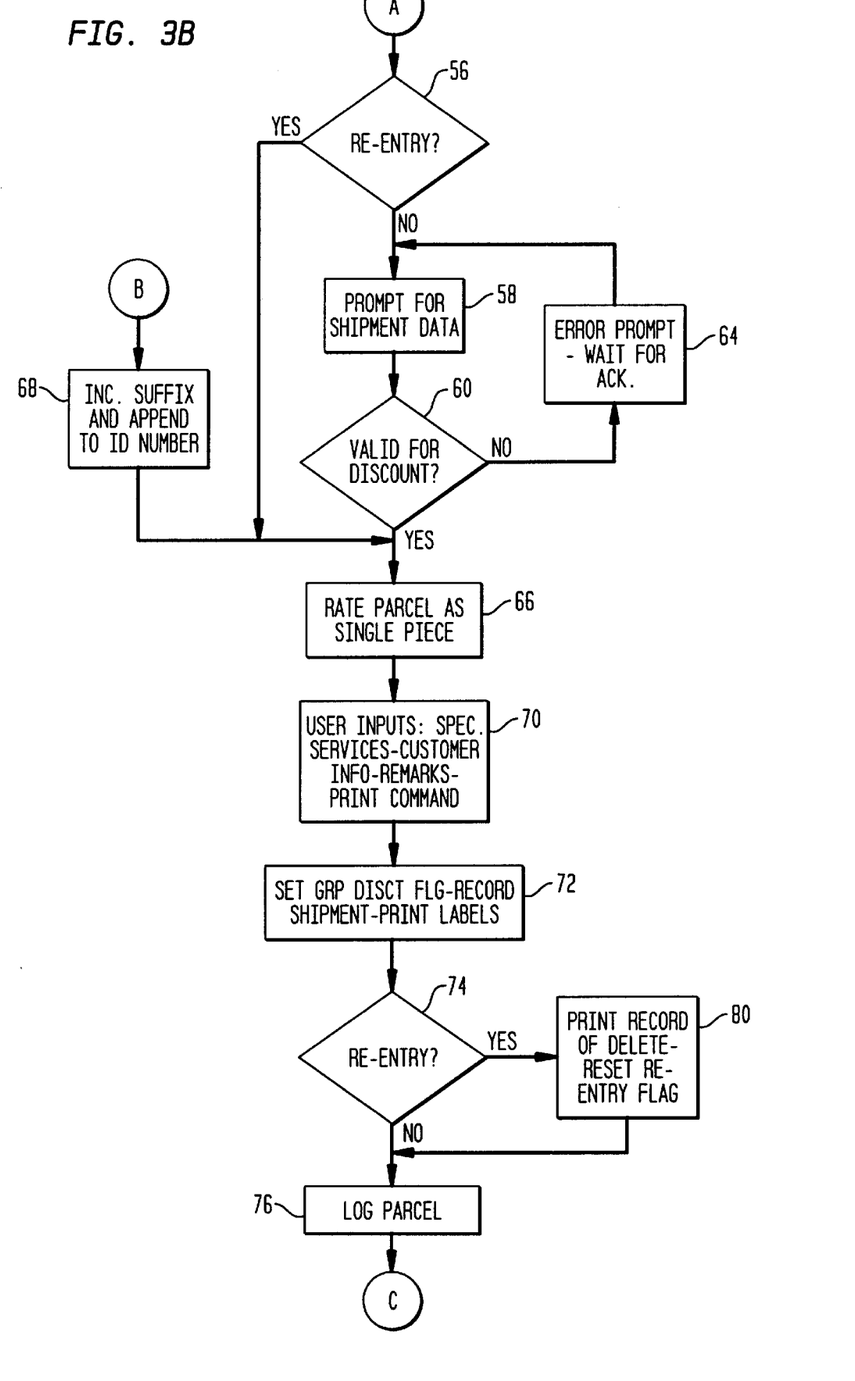

Turning to FIG. 3b, at 56 microprocessor 20 tests to determine if the re-entry flag has been set. If the re-entry flag is not set, microprocessor 20 prompts for input of shipment data for a first parcel at 58, and at 60 determines if the shipment data defines a parcel which is eligible for a group discount. If the parcel is not eligible for a group discount, then, at 64, an error prompt is displayed and microprocessor 20 waits for acknowledgement from the operator and then returns to 58 to prompt for shipment data. (Again, the operator has the alternative of aborting the group discount determination.)

If the parcel shipment data is valid for a group discount, or if the re-entry flag is set then at 66 microprocessor 20 rates the parcel as a single piece and stores the resulting single piece charge. Similarly, if at 30 it is determined that a group discount determination is in process then microprocessor 20 increments the suffix and appends it to the identification number at 68 and goes to 66 to rate the parcel as a single piece and then goes to 70.

At 70 the operator, inputs information which may vary from parcel to parcel within a group such as special service requests or remarks. At this point the operator may also input customer information, such as an address if the system prints address labels, or remarks, and a print command to generate a shipping label. Then at 72 microprocessor 20 sets the group discount flag and records the parcel as part of the group on the group discount manifest, and prints any necessary labels.

Further description of keyboard 14 and its use is not believed necessary for an understanding of the subject invention, except to note that, in accordance with one embodiment of the subject invention as will be described further below, particular keys or sequences of key strokes are provided to initiate various functions in the determination of group discount charges.

FIGS. 3A, 3B, 3C and 3D show a flow chart of the operation of the system of FIG. 1 in determining group discount rates. At Start a parcel is placed upon platform 13 and its weight is determined in a conventional manner which need not be discussed further for an understanding of the subject invention. At 30 microprocessor 20 determines if a group discount determination is in process and, if not, at 32 prompts for input of a parcel identification number. At 34 microprocessor 20 inputs the parcel identification number from keyboard 14 and also receives the group discount signal. (If no group discount signal is received the parcel will be processed as a single piece in a conventional manner.) At 36 microprocessor 20 tests to determine if the identification number matches a previously stored single piece identification number and, if so, at 40 momentarily prompts to indicate a duplicate identification number and returns to 32.

If no single piece match is found, then at 42 microprocessor 20 searches to determine if the identification number has been used for a previous group, and, if not displays the identification number with the first suffix appended at 44. Returning to 42, if the parcel identification number has been used for a previous group the system assumes that the operator wishes to add this parcel to that group and, at 50, prompts by displaying the identification with the next suffix after the last previously used suffix and then, at 52 sets a re-entry flag to indicate that the previously completed group has been re-entered for addition of one or more parcels and gets the previously stored shipment data for that group.

Then at 74 microprocessor 20 tests again to determine if the re-entry flag is set, and if not at 76 logs the parcel as part of the group on the group manifest. If the reentry flag is set then at 80 the previous record of the group is deleted and the system prints a record of the deletion to create a paper trail and the re-entry flag is reset and microprocessor 20 again goes to 76. Note that the group discount flag has been set at 72 and that additional parcels will be added to the group as though the group had never been closed until the group discount signal is input again, as will be described below.

Figure 3C:
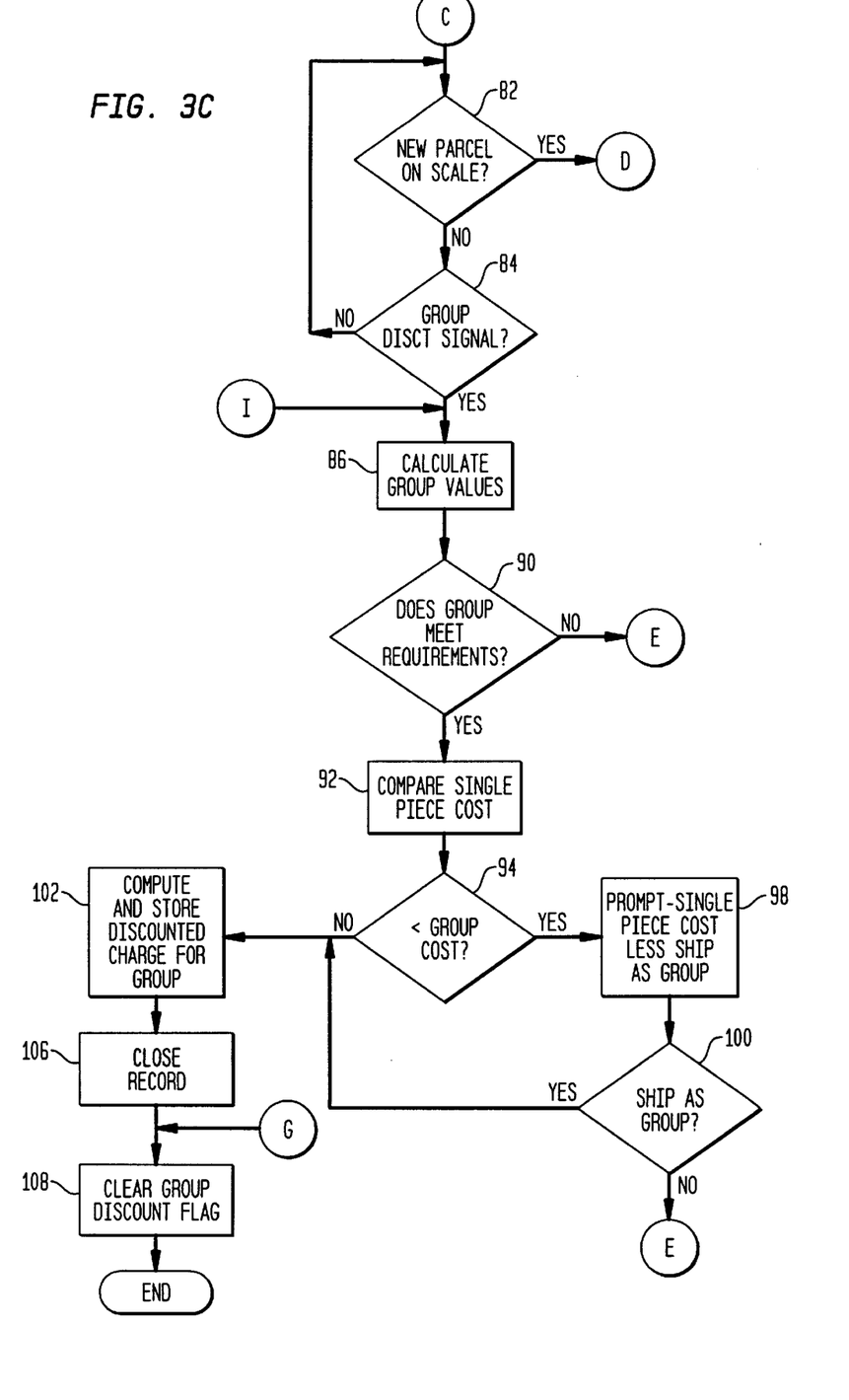

Turning to FIG. 3C at 82 and 84 microprocessor 20 tests to determine if a new parcel has been placed on the scale or if a group discount signal has been input, and continues to loop through 82 and 84 until either event occurs.

If a new parcel is placed on the scale then microprocessor 22 returns to 30 and since the group discount flag is set goes to 68 to process the next parcel.

If the group discount signal is input before a new parcel is placed on the scale microprocessor 20 "togels" out of the group discount determination and goes to 86 to calculate the group values to determine if they meet the predetermined requirements stored in the second portion of memory 22. Then, if at 90 microprocessor 20 determines that the group does meet the requirements, then at 92 the group rate is compared to the total single piece costs. Then at 94, if the total single piece cost is less than the group cost then, at 98 microprocessor 20 prompts to determine if the group should be shipped as a group or as single pieces. If, at 100 the operator indicates that the group should be shipped as a group, or if the group cost is less than the total single piece cost, then at 102 microprocessor 20 stores the discounted charge for the group, at 106 closes the record on the group manifest, and at 108 clears the group discount flag and the group discount determination ends.

Figure 3D:
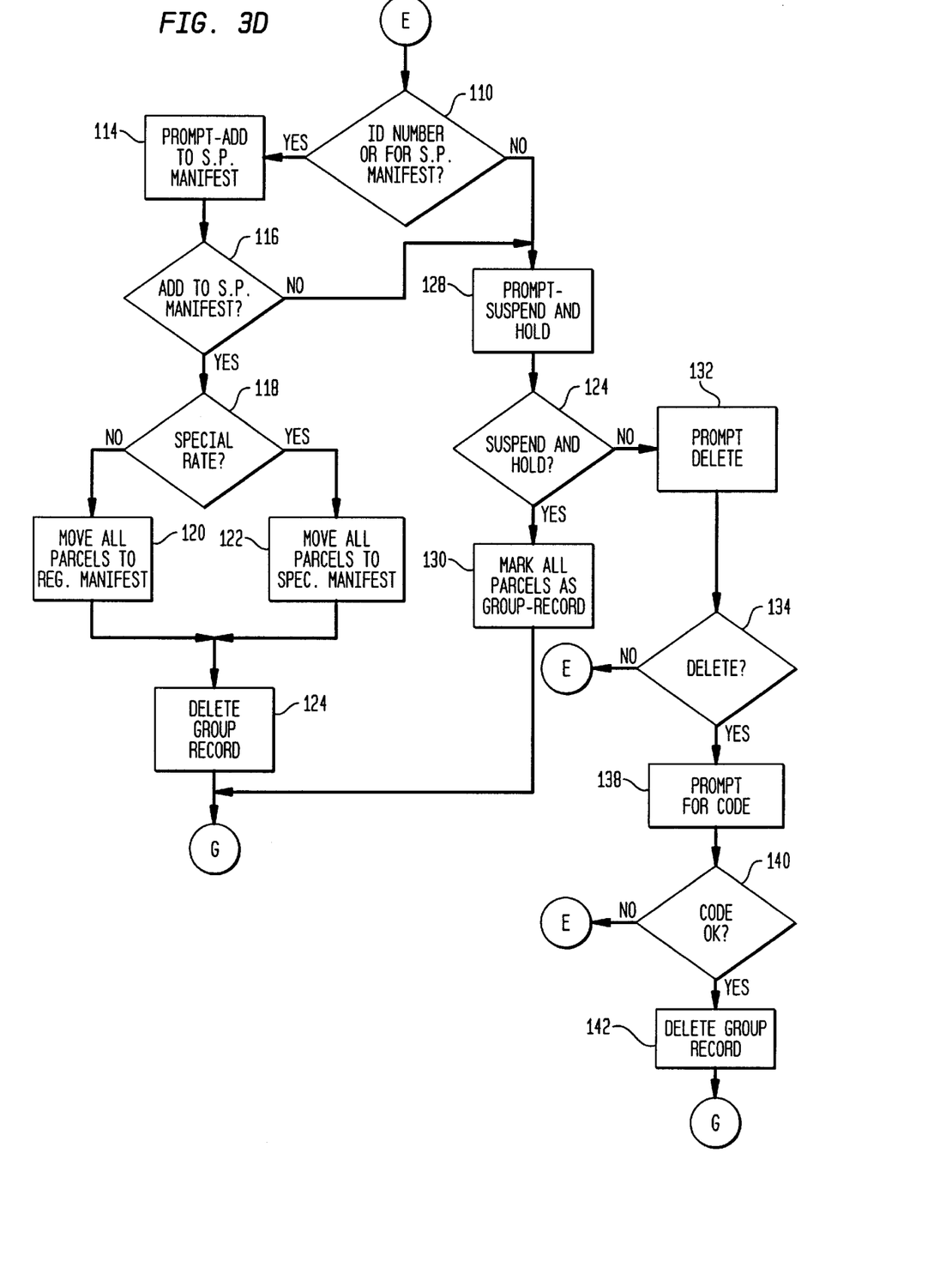

Returning to 90, if the group does not meet these stored predetermined requirements, or if at 100 the operator indicates that the group should not be shipped as a group, then at 110 in FIG. 3D microprocessor 20 determines if the identification number is ok for the single piece manifest. That is, microprocessor 20 determines if the parcel identification number plus suffix is consistent with the selected carriers requirements for a single piece parcel identification number. If the parcel identification number is consistent then at 114 the operator is prompted to determine if the parcels in the group should be added to the single piece manifest. If, at 116, the operator indicates that the parcels should be transferred to the single piece manifest, then at 118 microprocessor 20 determines if the parcels are eligible for a special rate, as described above, and if so, at 122 moves all parcels to the special rate manifest, or otherwise moves all parcels to the regular single piece manifest at 120, and then, in either case, at 124 deletes the group record, and returns to 108 to clear the group discount flag and ends.

If at 110 the parcel identification numbers were not acceptable for the single piece manifest or if at 116 the operator indicated that the parcels should not be transferred to the single piece manifest, then at 128 microprocessor 20 prompts the operator to determine if the operator wishes to suspend determination for this group and hold the information for later addition of other parcels. If at 129 the operator indicates that the group discount determination should be suspended, then at 130 the group is recorded as a group to be completed later and microprocessor 20 goes to 108 and ends the group discount determination.

If at 129 the operator indicates that the group discount determination should not be suspended then at 132 microprocessor 20 prompts to determine if the group should be deleted, if, at 134 the operator indicates that the group should be deleted then at 138 microprocessor prompts for input of an authorization code. Then, if at 140 the operator inputs a valid authorization code then, at 142 microprocessor 20 deletes the group record and goes to 108 to clear the group discount flag and end the group discount determination. If the operator declines to delete the group at 134 or fails to input a valid code at 140, microprocessor 20 returns to 110 since the operator must select one of the three available options if the group does not meet the predetermined requirements for the group discount.

Figure 4A:
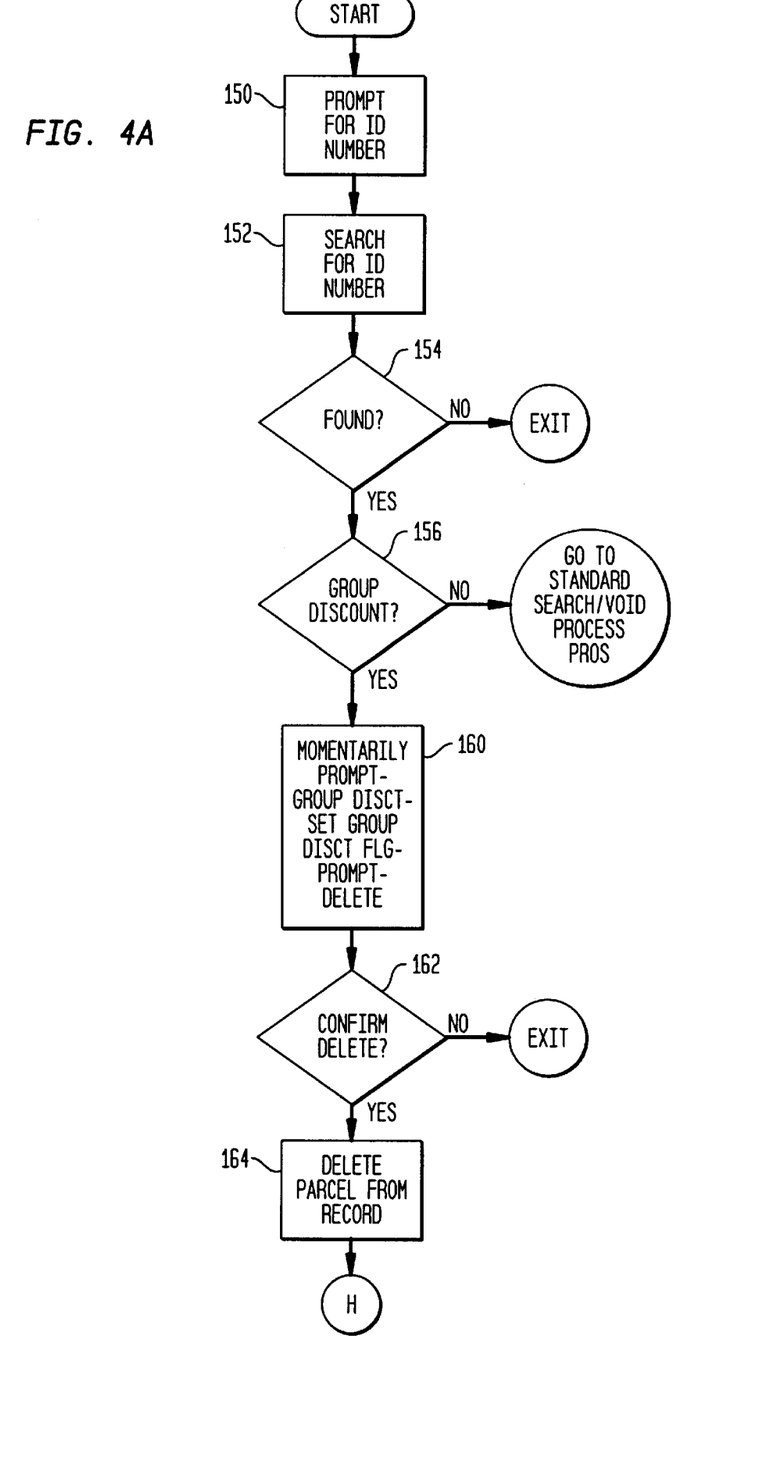
FIGS. 4a and 4b show a flow chart of the operation of the system of FIG. 1 in deleting a parcel from a group.
Figure 4B:
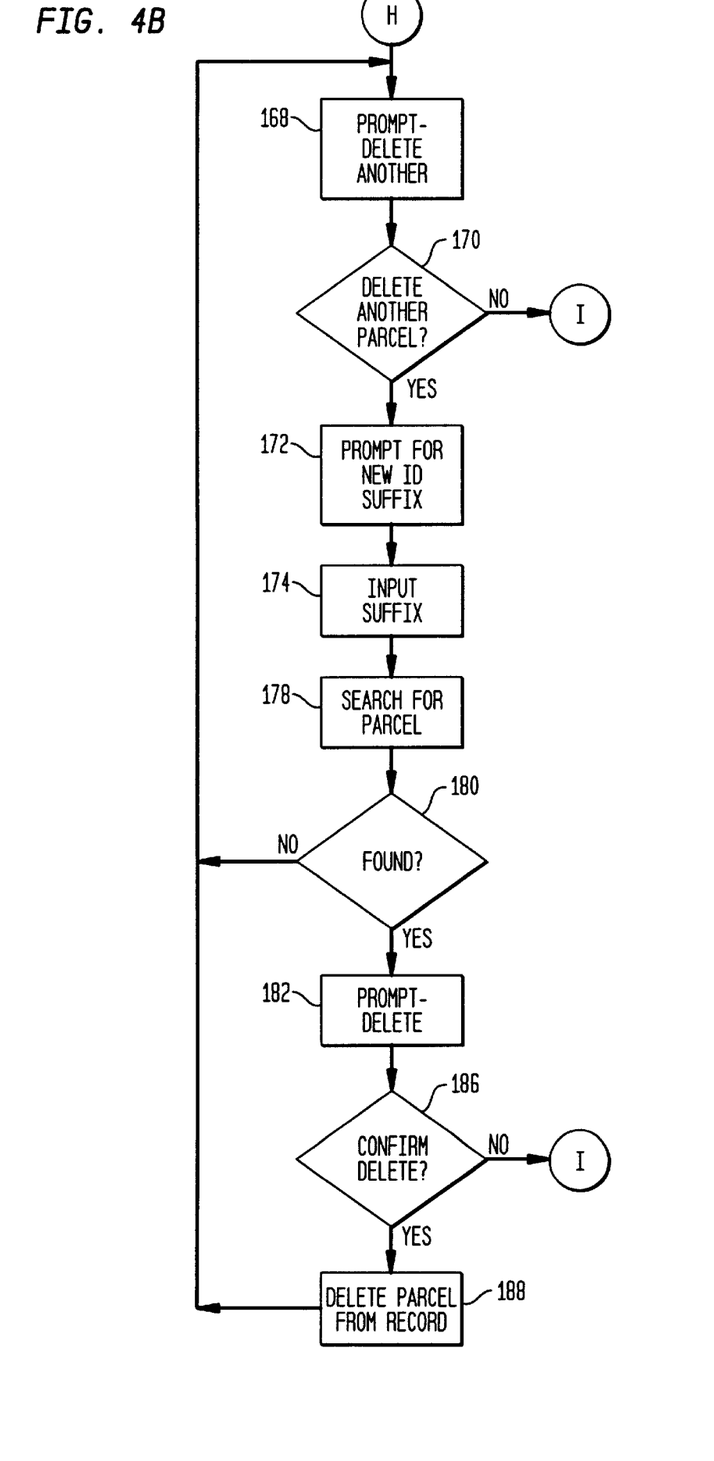

Turning to FIG. 4a, the operator may delete a particular parcel from a previously closed group by inputting a predetermined operator input signal through keyboard 14. Preferably the signal will be the same as that used to delete single piece parcels from the single piece manifest, as is known. At 150 microprocessor 20 responds to input of this signal by prompting the operator to input a parcel identification number. Then, at 152 microprocessor 20 searches for the input parcel identification number and then, at 154 if no such number is found exists. If the parcel identification number is found then at 156 microprocessor 20 determines if this is a parcel which is part of a group. If it is not part of a group microprocessor 20 exits to a standard search/void process for single piece parcels. If it is microprocessor 20 then, at 160, momentarily prompts to indicate that the parcel to be deleted is part of a group discount group, then sets the group discount flag and then prompts to determine if the operator wishes to confirm the request for deletion. Then, if at 162 the operator declines to confirm the request, microprocessor 20 exits. If the operator confirms then at 164 the parcel is deleted from the group manifest and, at 168 in FIG. 4B, microprocessor 20 prompts to determine if the operator wishes to delete another parcel. If at 170 the operator indicates that no more parcels are to be deleted then microprocessor 20 goes to 86 in FIG. 3C to recompute the discounted shipping charges and reclose the group. Then, if the operator indicates that additional parcels are to be deleted then at 172 microprocessor 20 prompts for a new ID suffix, and then at 174 the operator inputs another suffix identifying a parcel in the group and then at 178 microprocessor 20 searches for that parcel. If at 180 the parcel identified by the new suffix is not found microprocessor 20 returns to 168. If the parcel is found then at 182 microprocessor 20 prompts to confirm the deletion. If the deletion is not confirmed at 186 microprocessor again goes to 86 in FIG. 3C to predetermine the discounted shipping charges and close the group, otherwise at 188 the parcel is deleted from the record and microprocessor 20 again returns to 168.

Numerous other embodiments of the subject invention will be apparent to those skilled in the art from consideration of the Detailed Description set for above and the attached drawings. Particularly, though preferred embodiments may have been described in terms of separate memories, different areas of a single memory unit are considered fully equivalent to distinct memory units. According to the limitations on the subject invention are to be found only in the claims set forth below.

What is claimed is:

1. A manifest system for generating manifests for parcels shipped by a carrier, said carrier providing discounts for shipment of groups of parcels which meet predetermined requirements and are shipped to a common consignee, said system comprising:

a) first means for input of weight for parcel b) second means for input of information, said information including shipment data for selecting a class of service provided by said carrier, a parcel identification number, and a plurality of operator input signals;

c) a first memory for storing rate data;

d) a second memory for storing said predetermined requirements;

e) output means for outputting prompts to an operator; and, f) data processing means responsive to said weight, said shipment data and a first of said operator input signals to append a suffix to said parcel identification number and to store said weight and at least a portion of said shipment data with said parcel identification number and suffix for a first parcel, and for succeeding parcels to increment said suffix and store said parcel identification number and said incremented suffix, and said weight; and wherein g) said data processing means is further responsive to a second of said operator signals to determine if a group of parcels consisting of said first parcel and said succeeding parcels conforms to said predetermined requirements and, if so, determining discounted shipping costs for said group in accordance with said stored rates, said stored weights, and said stored portion of said shipping data, and if said group does not conform to said requirements controlling said output means to output a prompt to advise that said group does not qualify for said discount.

2. A system as described in claim 1 wherein after said data processing means receives said second operator input signal said data processing means is responsive to re-input of said parcel identification number in association with another parcel to again increment said suffix and append it to said parcel identification number for said another parcel and to redetermine said discounted shipping charges with said another parcel added to said group.

3. A system as described in claim 2 wherein for additional others parcels processed by said system after re-input of said identification number said suffix in successively incremented and appended to said parcel identification numbers for each of said additional other parcels and said additional other parcels are added to said group until said second operator input signal is again received, whereupon said discount charges are redetermined.

4. A system as described in claim 2 wherein said data processing means is further for processing said first parcel and said successive parcels as separate items if said group does not conform to said predetermined requirements.

5. A system as described in claim 4 wherein said data processing means is further responsive to a third of said operator input signals to save said stored information for said group for later addition of another parcel to said group.

6. A system as described in claim 2 wherein said data processing means is further for comparing said discounted shipping costs with shipping costs for said first parcel and succeeding parcels processed as separate items and controlling said output means to output a prompt advising that total shipping costs are lower if said first parcel and succeeding parcels are processed as separate items.

7. A system as described in claim 5 wherein said data processing means is further responsive to a fourth of said operator input signals to process said first parcel and succeeding parcels as separate items.

8. A system as described in claim 1 wherein said data processing means is further for processing said first parcel and said successive parcels as separate items if said group does not conform to said predetermined requirements.

9. A system as described in claim 8 wherein said data processing means is further responsive to a third of said operator input signals to save said stored information for said group for later addition of another parcel to said group.

10. A system as described in claim 5 wherein said data processing means is further for comparing said discounted shipping costs with shipping costs for said first parcel and succeeding parcels processed as separate items and controlling said output means to output a prompt advising that total shipping costs are lower if said first parcel and succeeding parcels are processed as separate items.

11. A system as described in claim 10 wherein said data processing means is further responsive to a fourth of said operator input signals to process said first parcel and succeeding parcels as separate items.

12. A system as described in claim 11 wherein said data processing means is responsive to a fifth of said operator input signals, said parcel identification number and a selected suffix to delete a parcel identification by said parcel identification number and selected suffix from said group, and then redetermine said discounted shipping costs if said group still meets said predetermined requirements.

\* \* \* \* \*